Figure 6:
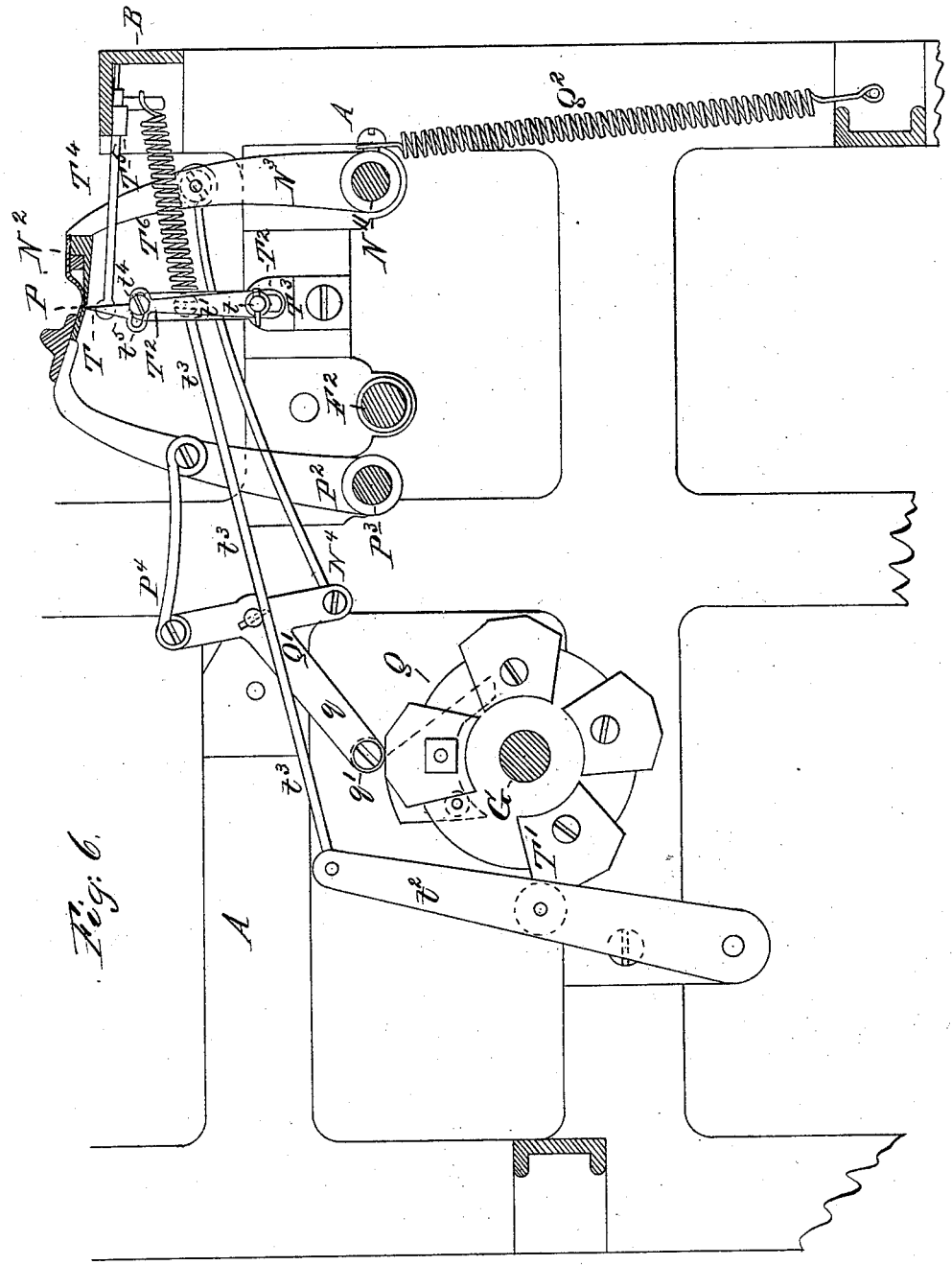

(Model.) H. SKINNER. 9 Sheets—Sheet 1.
LOOM FOR WEAVING MOQUETTE CARPETS.
No. 285,767. Patented Sept. 25, 1883.
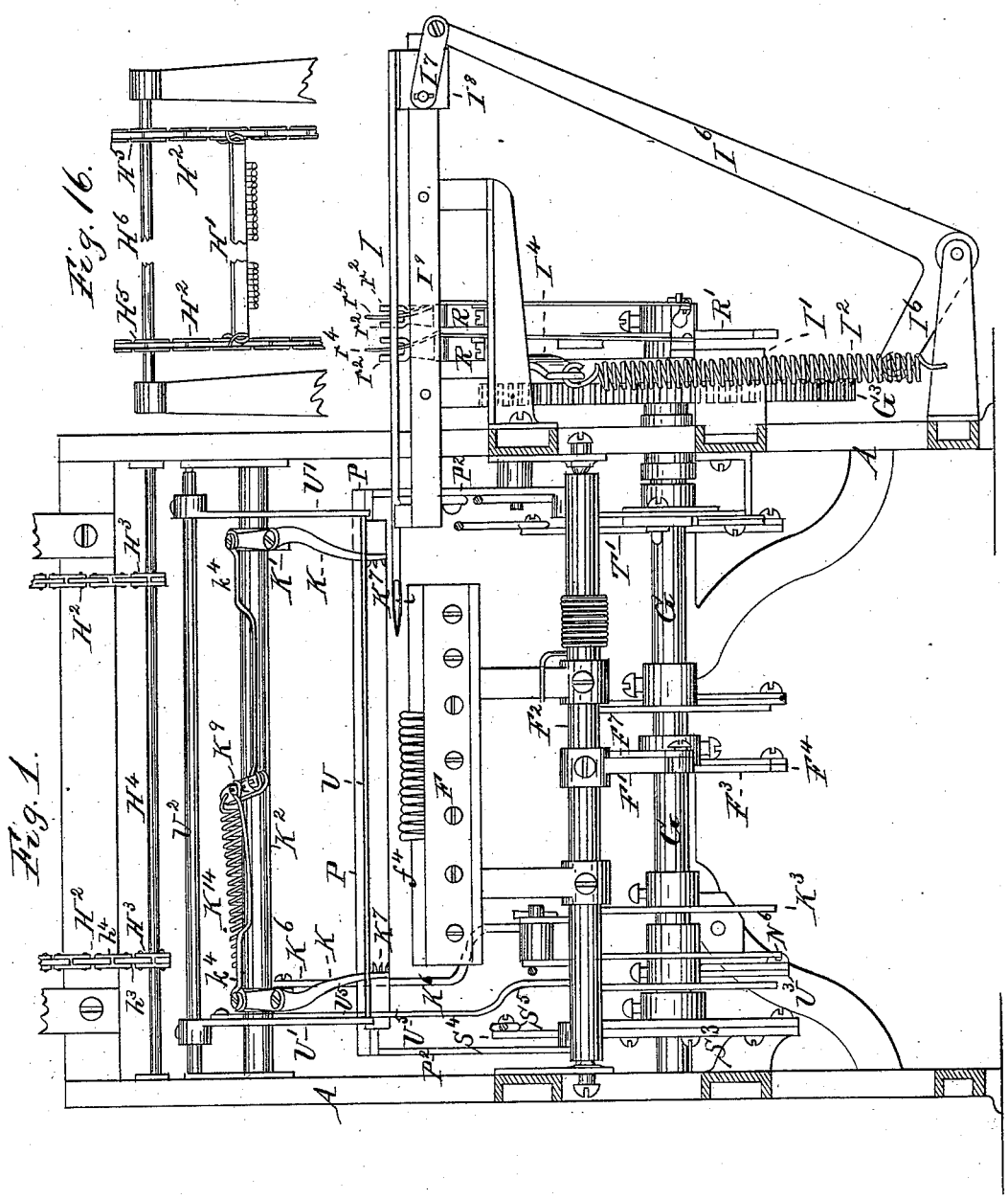
Witnesses.
Edward H. Brevoort
H. L. Bonnem
Inventor.
Halcyon Skinner
by his Atty.
E. S. Renwick

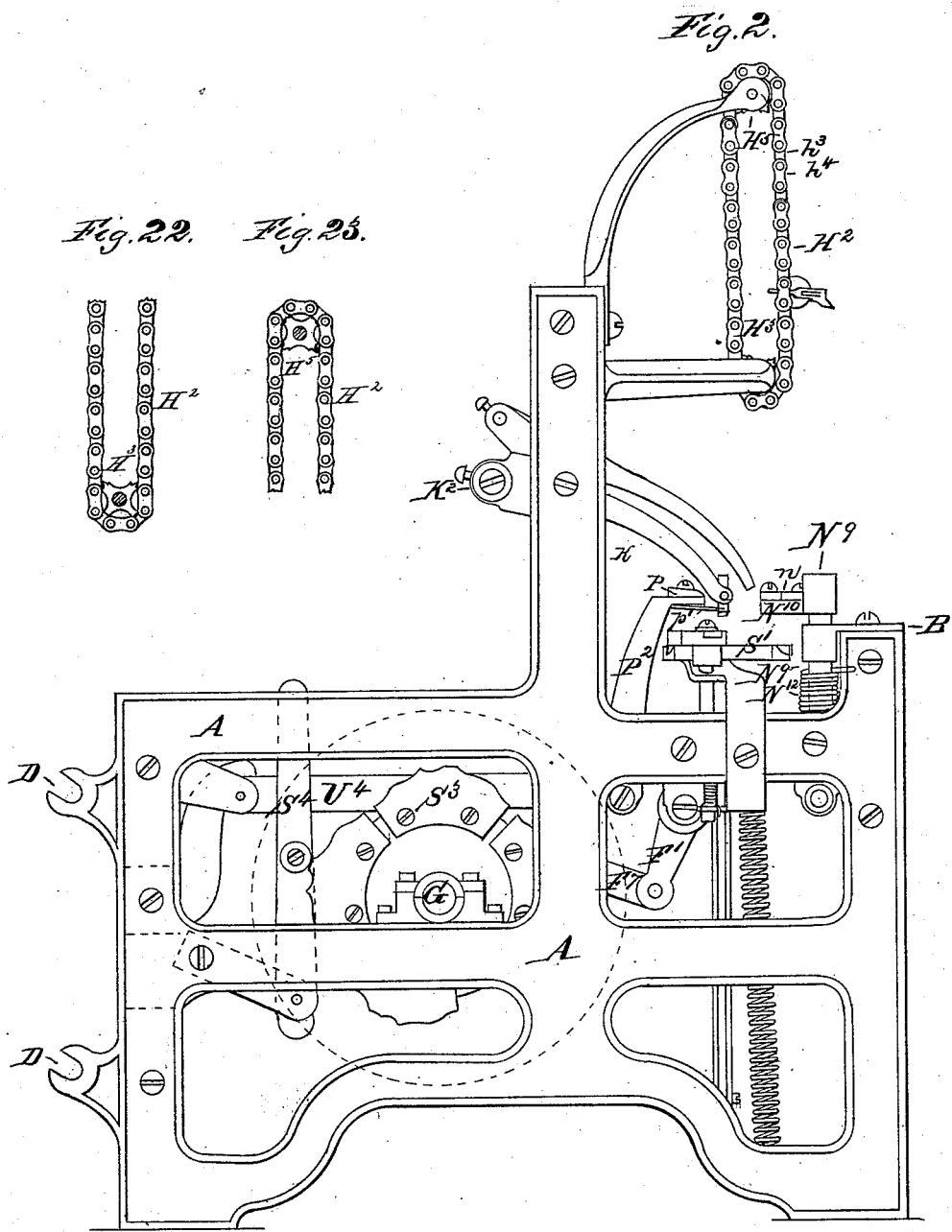

(Model.)
9 Sheets—Sheet 3.
H. SKINNER.
LOOM FOR WEAVING MOQUETTE CARPETS.
No. 285,767. Patented Sept. 25, 1883.
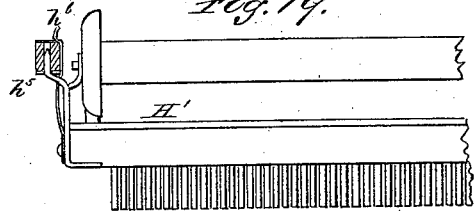
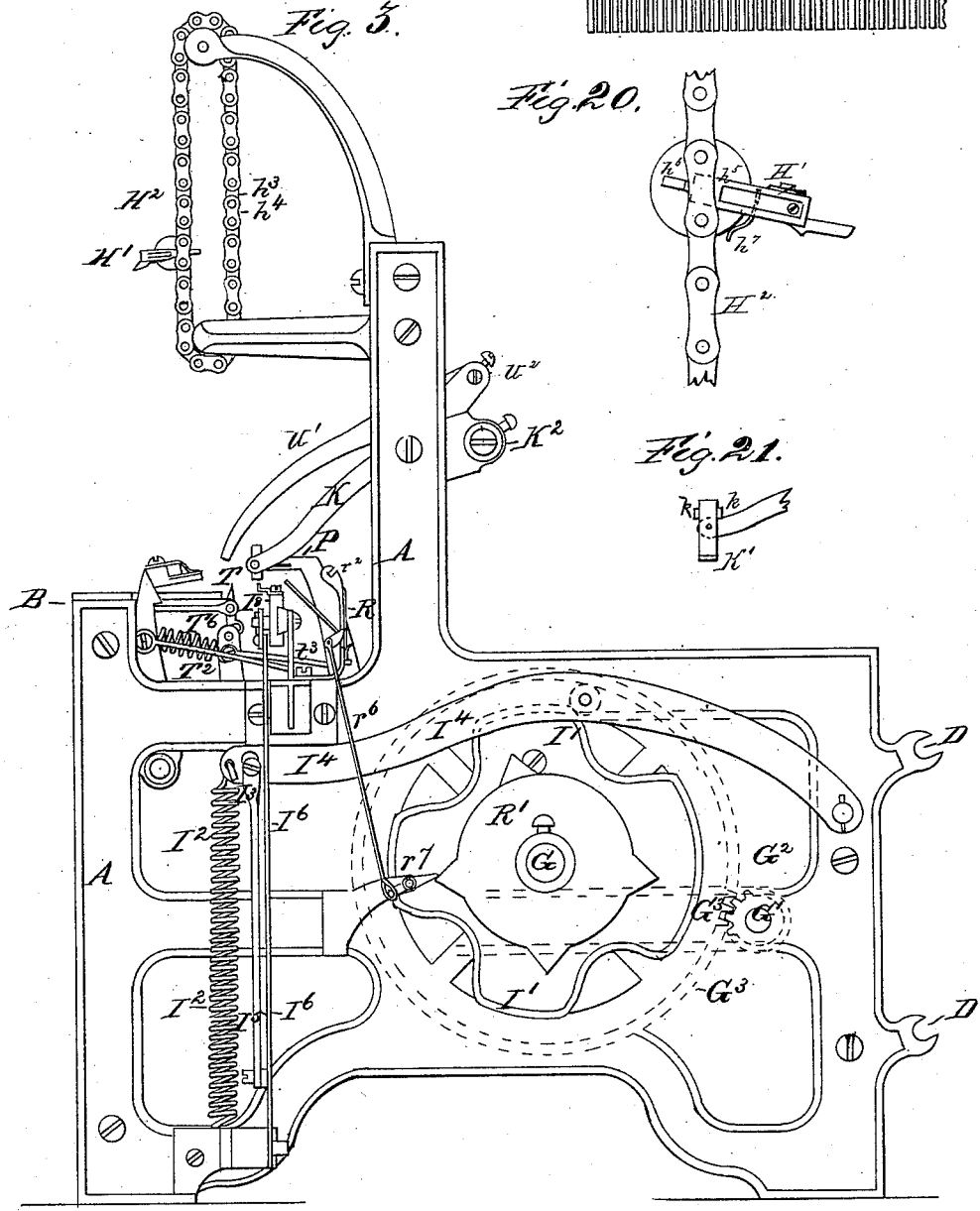
Witnesses.
Edward H. Brevoort
W. L. Bennem
Inventor
Halcyon Skinner
by his atty
E. S. Renwick

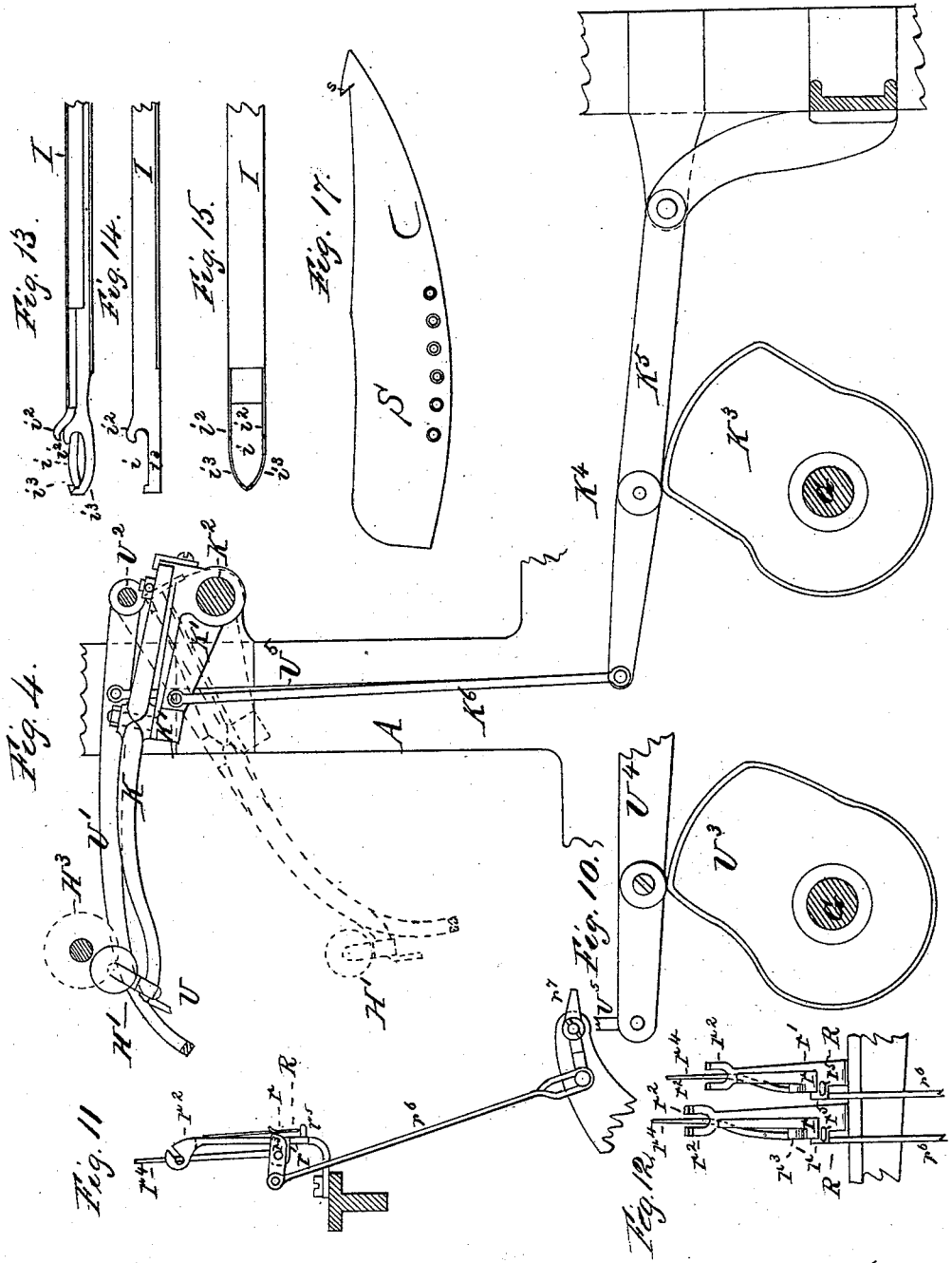

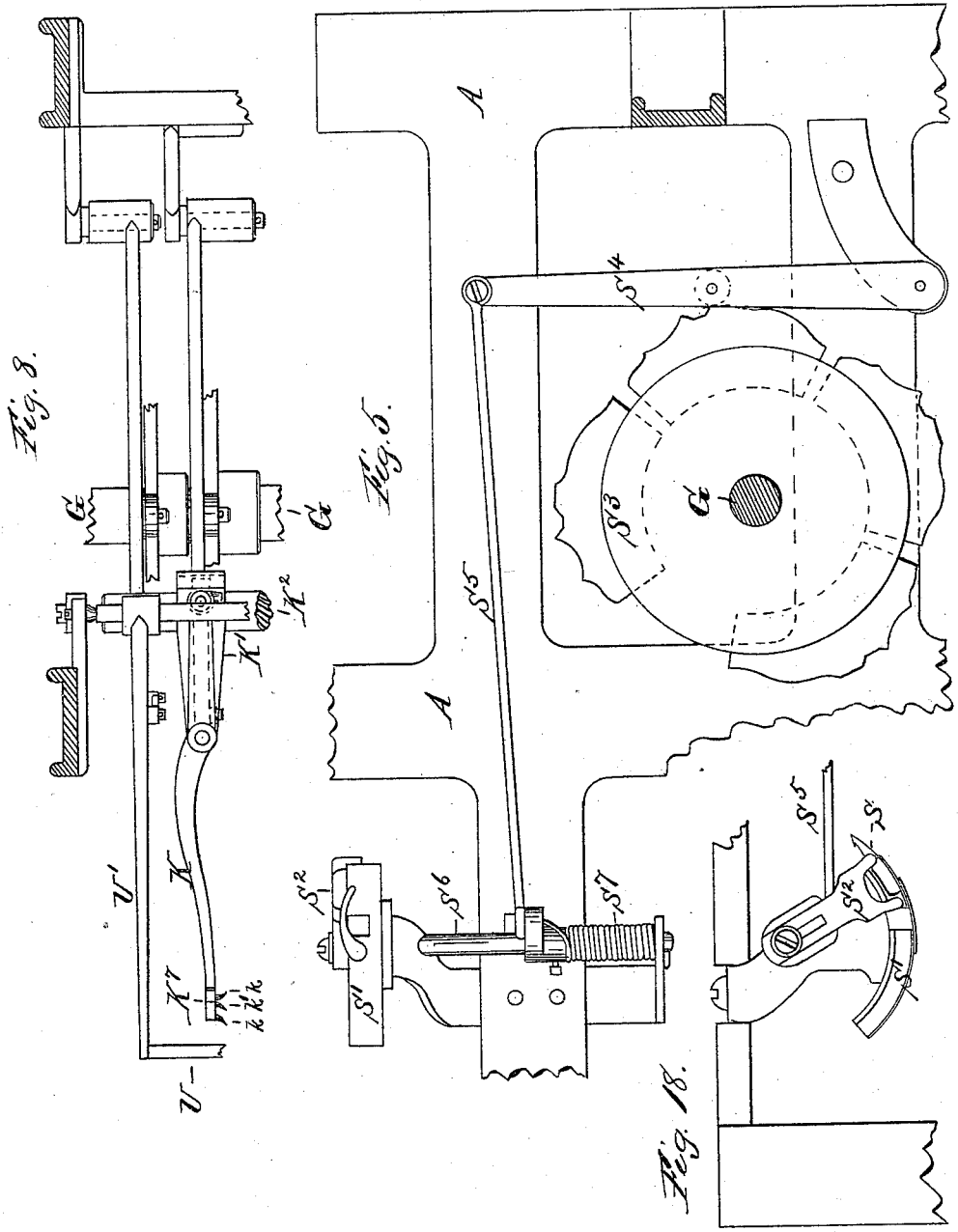

(Model.) H. SKINNER. 9 Sheets—Sheet 6.
LOOM FOR WEAVING MOQUETTE CARPETS.
No. 285,767. Patented Sept. 25, 1883.

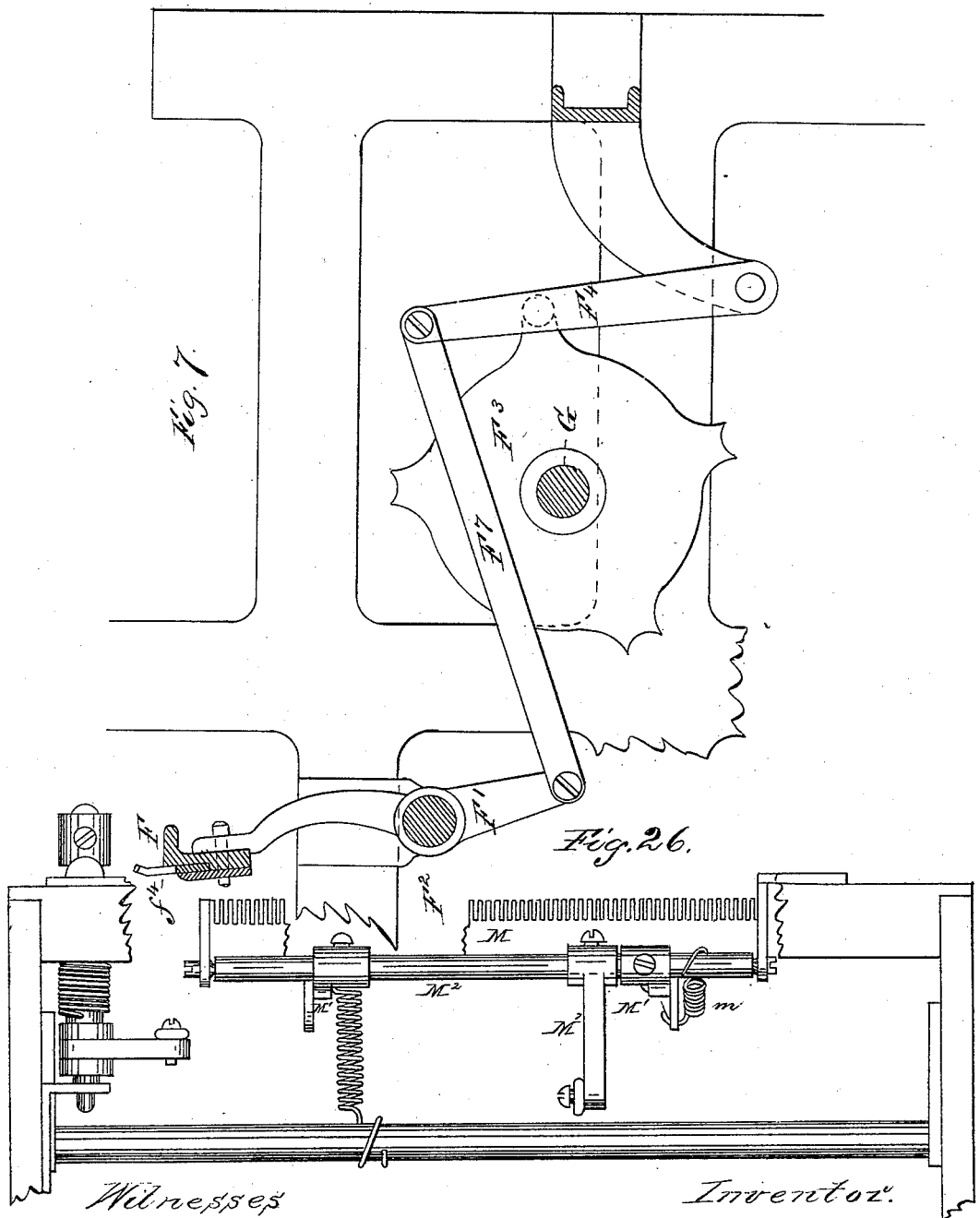

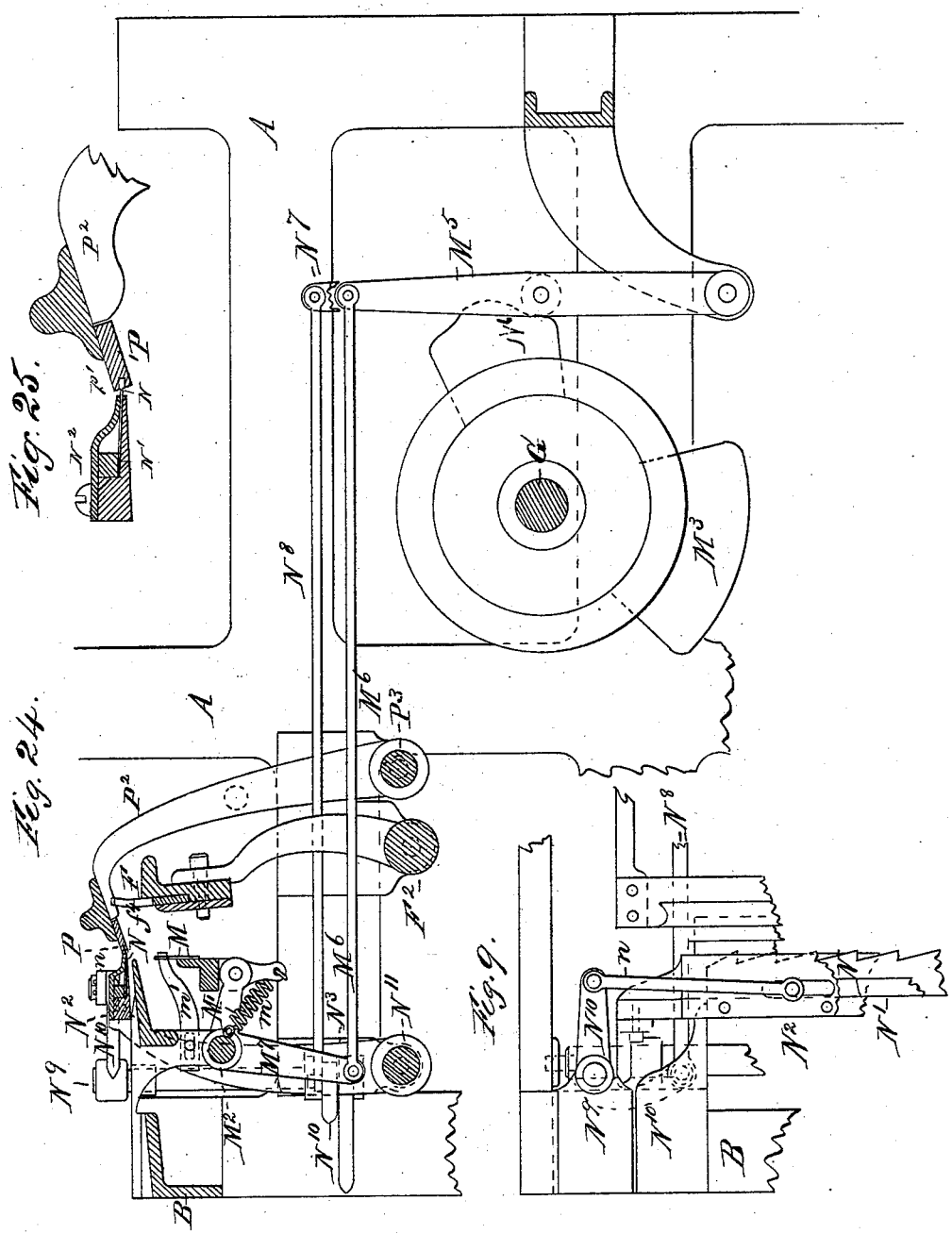

(Model.) 9 Sheets—Sheet 9.
H. SKINNER.
LOOM FOR WEAVING MOQUETTE CARPETS.
No. 285,767. Patented Sept. 25, 1883.
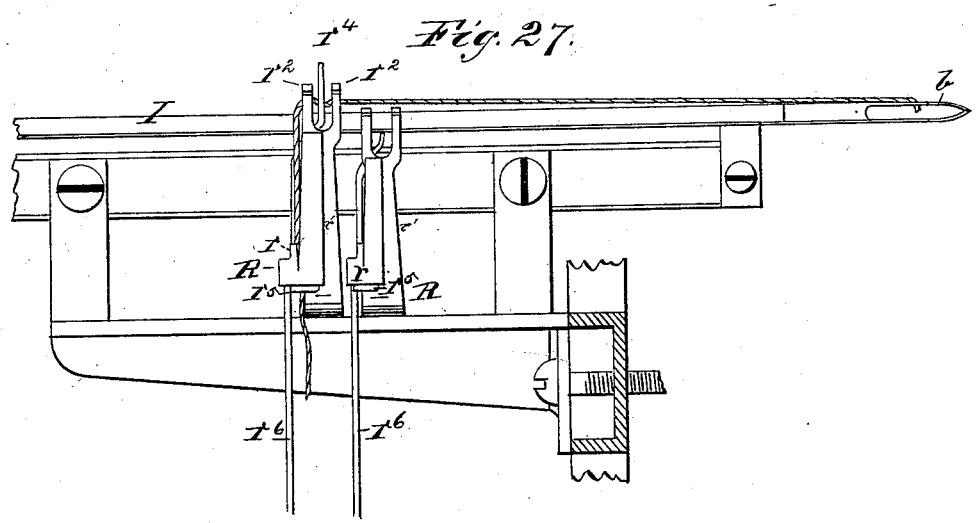
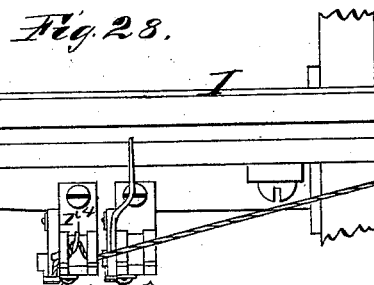
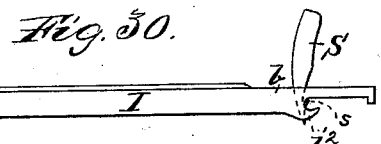
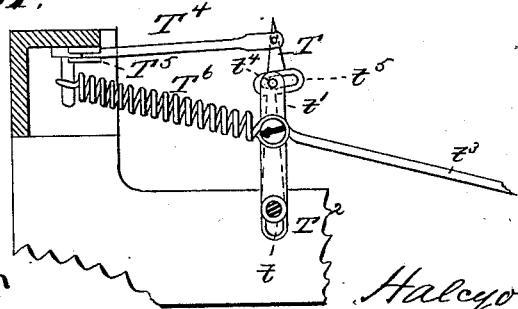
WITNESSES:
G. M. Barretto
Edw. R. Brevoort
INVENTOR:
Halcyon Skinner
by C. L. Renwick
ATTORNEY.

UNITED STATES PATENT OFFICE.

HALCYON SKINNER, OF YONKERS, NEW YORK, ASSIGNOR TO SMITH MCQUETTE LOOM COMPANY, OF SAME PLACE.

LOOM FOR WEAVING MOQUETTE CARPETS.

SPECIFICATION forming part of Letters Patent No. 285,767, dated September 25, 1883.

Application filed July 14, 1880. (Model.)

*To all whom it may concern:*

Be it known that I, HALCYON SKINNER, of Yonkers, in the county of Westchester and State of New York, have made an invention of certain new and useful Improvements in Looms for Weaving Moquette Carpets, and for such other purposes as said improvements may be applicable to; and I do hereby declare that the following is a full, clear, and exact description and specification of the same.

The objects of this invention are to enable Moquette carpets to be woven with greater facility, and to simplify the mechanism of the loom required for the purpose.

The invention consists of certain new combinations of mechanical devices, more or less of which may be embodied in a loom, as found expedient, and which are specified in detail in the claims at the close of this specification. These combinations or improvements may be applied with advantage to the Moquette loom described in the Letters Patent of the United States issued to Alexander Smith and Halcyon Skinner, January 16, 1877, No. 186,374, so as to simplify the mechanism, while embodying in substance the invention described in that patent. In order that these combinations may be fully understood, I have represented in the accompanying drawings such parts of a Moquette loom as are necessary for that purpose, and I will proceed to describe the same.

Figure 1 of said drawings represents a front view of the said loom with certain parts thereof removed. Fig. 2 represents the left-hand side of the same. Fig. 3 represents the right-hand side of the same. Figs. 4 to 31, inclusive, represent portions of the said loom detached from the other parts, and upon a larger scale than the preceding figures.

The general plan of the loom represented in the drawings is substantially the same as that of the Smith and Skinner loom described in the said Patent No. 186,374, the shed being opened by heddles, (which are not shown in the drawings,) the weft-thread being inserted by means of a reciprocating weft-carrier, I, the spools and spool-frames of the tufting material being held above the positions of the warp-threads by means of chains $H^2$, the spools being brought in succession downward to the warp-threads by transferring-arms K, the ends of the tufting material introduced between the warp-threads being turned upward around a filling or weft-thread by means of a comb, brush, or other equivalent for that purpose, and the tufting material being cut loose from the spool by cutting mechanism composed of two members, N P, which are moved toward and from the intermediate position at which the tufting material is cut.

The moving parts of the loom are connected with the loom-frame A, which carries the driving-shaft G' and the cam-shaft G, the latter being driven from the former by means of a cog-wheel, $G^3$, and a pinion, $G^2$. The driving-shaft in practice is fitted with the customary fast and loose pulleys for the driving-belt, and the usual belt-shipper and its connections are employed to shift the belt from one pulley to the other when accidents occur, and when the loom requires to be stopped and started. The warp is carried in the usual manner upon warp-rolls hung in bearings D at the rear of the loom-frame, and is conducted over the usual whip-rolls to and through the dents of the reed or its substitute carried by the lay F, and thence over the breast-beam B and downward to the cloth-roll. The lay F is of the construction described in the said Smith and Skinner patent, having pins or loops $f^4$, without an upper horizontal bar above the reed, and it is caused to reciprocate for the purpose of beating up the weft or filling, as is shown in Fig. 7, by means of the lay-cam $F^3$, which is secured to the cam-shaft G, and is caused to operate upon the lay through the intervention of the lever $F^4$, the connecting-rod or link $F^7$, and the vibrating arm $F'$, secured to the rock-shaft $F^2$ of the lay. In the loom, parts of which are represented in the drawings, the cam-shaft G is arranged to make one revolution for every four insertions of filling or weft-thread; hence the lay-cam $F^3$ is fitted with four protuberances to operate the lay at the required times, and each protuberance is by preference formed with duplex grades, so as to cause the lay to make two blows against each shoot of filling.

In order that the filling or weft-thread may be introduced into the shed or warp-threads opened by the movement of the heddles, the weft-carrier I is provided. This weft-carrier is caused to move to and fro crosswise of the loom by means of a slide, $I^8$, which is mounted upon a guide-bar, $I^9$, and is driven to and fro by means of the filling-cam $I'$, which is mounted upon the cam-shaft G, and operates upon the slide $I^8$ and the weft-carrier I through the intervention of the lever $I^4$, the link or connecting-rod $I^5$, the elbow-lever $I^6$, and the link $I^7$. The filling-cam moves the weft-carrier in one direction, and a spring, $I^2$, is provided to move it antagonistically to the cam. In such looms the weft-carrier may be replaced by a shuttle and shuttle-drivers; but if that part of the present invention is used which has special reference to the construction of the weft-carrier, the latter is employed, and it is constructed with an open head, $i$, Figs. 1, 13, 14, 15, which is wedge-formed, so as to enter readily between the warp-threads forming the open shed. The rear side of the head is provided with projections $i^2 i^2$, for catching and carrying the weft-threads. One of these projections $i^2$ is on the rear edge of the upper side of the head, and the other projection is on the rear edge of the under side of the head. Two grades of weft-thread or filling are used, the one coarse and the other fine. These two threads are drawn from bobbins set at the right-hand side of the loom, and are held by a vibrating weft-holder, such as the eye-guide weft-holder described in the said Patent No. 186,374, and which therefore is not represented in the drawings. This weft-holder is caused to reciprocate up and down by a cam and its connections, so as to present one or other of the weft-threads within the range of movement of the projections of the weft-carrier. The weft presented by the weft-holder is engaged by both projections of the head of the weft-carrier, so that the weft-thread on the head of the weft-holder is in the form of a loop, the bight of which crosses in an upright direction the opening of the head, so that the loop is held open for the entrance of the selvage-shuttle, hereinafter described.

In order that the weft may be caused to lie straight in the shed, it should be subjected to suitable tension, and this is effected, according to the present invention, by means of a spring-tension weft-guide. There are two of these guides, R R, Figs. 1, 11, 12, 27, and 28, in the loom, set at different levels, the higher guide being used for the coarse filling and the lower guide for the fine filling, around which the tufting material is turned. Each of these tension-guides consists of a spring-nipper, $r$, Figs. 11, 12, and 27, and a stock, $r'$, between the adjacent surfaces of which the thread is conducted, so that the pressure of the spring effects the necessary tension.

In order that the tension may be relieved when the weft-thread is pulled through the shed rapidly, the tension-stock is surmounted by a pair of notched thread-guides, $r^2$, separated by a space, through which guides the weft-thread is conducted, and a cam, $r^3$, is pivoted to one side of the tension-stock in a position to operate upon the spring-nipper $r$ and move it outward from the tension-stock $r'$, thus relieving the pressure upon the thread, and consequently the tension. This tension-cam $r^3$ is provided with an arm or finger, $r^4$, which projects upward opposite the space between the two notched guides $r^2$, and the weft-thread passing through the notched guides is bent in a horizontal loop round this cam-finger $r^4$, so that the strain on the thread tends to shorten the loop and draw the cam-finger $r^4$ toward the notched guides, thereby rocking the tension-cam $r^3$ and moving the spring-nipper $r$ outward, thus slacking the pressure on the weft-thread. On the other hand, the pressure of the spring-nipper against the tension-cam tends to move the cam-finger $r^4$ in the direction the reverse of that due to the strain upon the weft-thread, and the weight of the rod $r^6$, hereinafter described, also tends to move the cam-finger $r^4$ in the same direction; hence when the pull upon the weft-thread is light the finger $r^4$ is borne outward from the line of the weft-guides $r^2$, the nipper-cam is turned upward, and the spring-nipper then acts strongly upon the weft-thread; but when the pull upon the weft-thread is strong (as is the case when the weft-carrier is carrying the weft rapidly across the shed) the strain of the thread upon the finger $r^4$ pulls it toward the notched guides, thereby moving the tension-cam $r^3$, which operates upon the spring-nipper and reduces the tension upon the weft-thread.

In order that the weft-thread may be properly guided to the spring-nipper, the outer side of the tension-stock $r'$ is provided with an eye-guide, $r^5$, through which the weft-thread from the bobbin is passed.

The filling is carried by the weft-carrier, in the form of a loop, from the side of the loom at which the slide of the weft-carrier is situated to the opposite side, and is secured at the opposite side by means of a selvage-thread, which is inserted through the loop of weft-thread by means of a reciprocating selvage-shuttle similar to that employed in sewing-machines. This selvage-shuttle S, Figs. 17, 18, and 30, is fitted to traverse a curved groove forming the shuttle-race S', which is supported upon the loom-frame within the range of movement of the head of the weft-carrier I, and the shuttle-race is notched at its inner side, and is grooved crosswise to permit the head of the weft-carrier to enter it and hold the loop of weft-thread within the range of movement of the shuttle, so that the latter may be passed through that loop. The selvage-shuttle is set in the shuttle-race with its point pointing toward the rear of the loom, and is moved to and fro by means of a reciprocating shuttle-driver, $S^2$, whose horns embrace the shuttle, but with sufficient play or space between the shuttle and the horns to permit the weft-thread to pass between them.

The shuttle-driver S² is operated by means of the shuttle-cam S³, which is fitted with four cam projections corresponding with the four operations of the weft-carrier produced by one revolution of its cam I', one of said cam projections, with its grades numbered, being shown at Fig. 29. The shuttle-cam operates upon the shuttle-driver through the intervention of the upright lever S⁴, the connecting-rod S⁵, the upright rock-shaft S⁶, to which the shuttle-driver is secured, and the arm of that rock-shaft. A spring, S⁷, is provided to move the shuttle-driver antagonistically to the cam. In the operation of the loom it is expedient that the shuttle, after, first, being passed point foremost into the bight of weft-thread held by the head of the weft-carrier, should be, second, retrograded slightly and held at rest, or nearly so, with its neck within the opening of the head of the weft-carrier, as shown in Fig. 30, while the head of the weft-carrier is drawn backward over the shuttle-neck, and after the head of the carrier has disengaged from the shuttle the latter should, third, be advanced to its full extent to carry the shuttle-body through the loop of weft-thread, after which the shuttle should, fourth, be retrograded slightly, so as to open the space between the rear horn of the shuttle-driver and the butt of the shuttle for the easy passage of the weft-thread, and should be held at rest during such passage. In the form of loom represented in the drawings these two periods of rest are attained by making corresponding portions of the shuttle-cam grade concentric with the cam-shaft. This mode of operating the selvage-shuttle requires the head of the weft-carrier to be constructed of spring-jaws $i^3$ $i^3$, Figs. 13, 14, and 15, so that they may separate when drawn backward over the neck of the shuttle, and may then reapproach each other and constitute the wedge-formed head $i$. It is further expedient that the selvage-thread carried by the shuttle should be drawn tight as the weft-carrier retrogrades, so as to produce a tight selvage. This result is attained by forming the shuttle-cam grade so as, fifth, to advance the shuttle and permit it to rest after the weft-carrier has, in its retrograde movement, drawn the loop of the weft-thread between the butt of the shuttle and the shuttle-driver. It is expedient, also, that the drawing of selvage-thread from the shuttle should not occur when the lay beats up the shoot of filling and drives the cloth toward the breast-beam of the loom, and this result is attained by forming the shuttle-cam grade so that the shuttle is, sixth, retrograded or moved butt foremost toward the breast-beam when the lay beats up. The last incline of the shuttle-cam grade, seventh, retrogrades the shuttle to its most forward position in the loom, so that it is ready to be advanced through the bight or loop of the next shoot of filling or weft-thread. The several grades of each cam projection of the shuttle-cam S³, which, in connection with the spring S⁷, accomplish the above-described movements of the shuttle in the loom represented in the drawings, are designated, respectively, in Fig. 29, by the numbers 1, 2, 3, 4, 5, 6, and 7.

In order that the weft-thread may not slip off the tapering point of the shuttle when the weft-carrier is retrograded, the point of the shuttle is barbed, as shown at $s$, Fig. 17. The shoulder of this barb prevents the weft-thread from slipping off the shuttle-point. The entrance of the selvage-shuttle into the loop of the weft-thread spreads it. In order that the loop of weft-thread may spread or expand readily as the shuttle-body is passed through it, the weft-thread, before being entered into the shed, is bent around a horn, T, Figs. 3, 6, and 31. When the weft-carrier is advanced into the shed, this horn is held in an erect position at the side of the loom from which the weft-carrier advances, and is in the angle between the line of the selvage and the line of travel of the head of the weft-carrier, so that the thread of weft or filling extending from the adjacent selvage to the weft-carrier is bent in a loop round this horn, or engaged with it, as the weft-carrier advances to the shed. When, however, the weft-carrier is advanced to the opposite edge of the shed, the horn is drawn downward, so as to release the loop of weft-thread formed upon it, thereby leaving the weft-thread slack, and permitting the slack to be drawn to the opposite side of the shed by the spreading of the loop incident to the entrance of the shuttle into it. Before the next shoot of weft-thread is carried across the shed, the weft-horn is moved rearward of the loom, and is raised and moved toward the breast-beam, so as to engage with the next shoot of weft-thread at a part thereof between the selvage of the carpet and the head of the weft-carrier. The weft-horn T has, therefore, movement in four directions imparted to it—viz., rearward, (or from the breast-beam,) descending, forward, (or toward the breast-beam,) and ascending; and it has been found convenient to impart all four of these movements by means of a single cam, T'. To this end the stock T² of the weft-horn is connected with its supporting-bracket T³ by a pivot, $t$, passing through an upright slot in the lower end of the stock, so that the stock may rise and descend as well as swing forward and backward on the pivot. The stock also is fitted with a bar, T⁴, whose head is pivoted to the stock, and whose shank projects forward into a friction-box, T⁵, secured to the breast-beam of the loom. This friction-box is lined with leather, so that the friction incident to the pressure of the leather of the box against the bar T⁴ tends to hold it and the horn-stock T² from moving forward and backward. The horn-stock T² is operated by the weft-horn cam T' and the spring T⁶, working antagonistically to the cam, these two being connected with an arm, $t'$, Figs. 6 and 31, arranged to vibrate upon the rocking pivot $t$ of the horn-stock and at one side of that stock, the spring being directly connected with the arm $t'$, and the cam being connected with the arm through the intervention of the upright cam-lever $t^2$ and the connecting-rod $t^3$. The vibrating arm $t'$ is connected laterally with the horn-stock $T^2$ by means of a pin or pivot, $t^4$, Figs. 6 and 31, working in a slanting slot, $t^5$, formed in the head of the horn-stock. When the horn-cam moves the arm rearward, the friction of the friction-bar $T^4$ in its friction-box $T^5$ tends to hold the horn-stock from moving with the arm $t'$; hence the movement of the pin or pivot $t^4$ in the slanting slot $t^5$ depresses the stock and horn until the pivot reaches the rear end of the slot, whereupon the continued rearward movement of the arm $t'$ overcomes the friction of the friction-bar $T^4$ in the friction-box $T^5$ and pulls the horn rearward. When, on the other hand, the horn-cam $T'$ permits the spring $T^6$ to move the vibrating arm $t'$ forward, the friction of the friction-box upon the friction-bar resists the forward movement of the horn-stock; hence the pin $t^4$ moves in the slanting slot $t^5$, and raises the stock and horn until the pin reaches the forward end of the slot, whereupon the continued movement of the vibrating arm by the spring again overcomes the resistance of the friction-box $T^5$ upon the friction-bar $T^4$ and moves the stock and weft-horn bodily forward. The weft-horn cam $T'$ is fitted with cam projections corresponding in number with those of the weft-carrier cam I', so that the weft-horn is operated for each operation of the weft-carrier. The time at which the weft-horn is withdrawn from the weft-thread depends upon the quantity of slack that is required, and this depends upon the width of the carpet being woven, for, if the carpet is narrow for the loom, its edge will be some distance laterally from the weft-horn, and the weft-thread will in such case form a large loop upon the weft-horn, which must be released (by the downward movement of the weft-horn) before the head of the weft-carrier reaches the selvage-shuttle race, so as to permit such slack to be drawn into the shed by the continued advance of the weft-carrier. The cam projections of the weft-horn cam $T'$ should therefore be varied to suit the width of the carpet being woven, the front or advancing end of each of the cam projections being extended so that it will operate the weft-horn sooner when the width of the carpet is reduced. After the shuttle has passed through the bight of weft-thread, any surplus of weft-thread must be drawn back through the shed or taken up, so as to form a tight selvage. In order that this surplus may be drawn back or taken up, the cam-finger $r^4$, Figs. 1, 11, 12, 27, and 28, is operated at the proper time by a revolving cam, R', Figs. 1 and 3, which moves the finger outward of the space between the notched guides, so that when this revolving take-up cam operates the finger, the latter enlarges the loop of weft-thread upon it and extending from the notched guides $r^2$. As the take-up cam R' at the same time rocks the rocking cam $r^3$ away from the spring-nipper $r$, it permits the nipper $r$ to hold the weft-thread firmly at a point between the notched guides and the bobbin, so that the weft-thread cannot then be drawn from it; hence whatever weft-thread is drawn into a loop by the take-up action of the cam-finger $r^4$ is taken from the portion in the shed, and consequently that portion is drawn back in the fabric to form a close selvage.

The take-up cam R' operates upon each cam-finger $r^4$ through the intervention of a lever, $r^7$, Figs. 3 and 11, and a connecting-rod, $r^6$, which last is connected by a pivot with the lever-formed stock of the tension-cam $r^3$. The cam projection for each cam-finger is so set that it causes the finger to take up the weft-thread as the weft-carrier commences to retrograde, or thereabout, or before the shed is closed. As there are two sizes of weft-thread used in the loom represented in the drawings, there is a finger $r^4$ and $r^4$ for each thread. When the loom is constructed according to the foregoing description, each movable finger $r^4$ is caused to operate both as a tension device and as a take-up finger for the weft-thread or filling. These functions may, however, be divided between two separate fingers, one of which operates in connection with a pair of guides, (either notched or having eyes in them for the thread,) so as to produce the requisite tension, while the other is operated either in connection with the same pair of guides or with a different pair, as a take-up to take up the surplus weft-thread, (after the shuttle-thread is engaged with the weft-thread,) and to produce a close selvage.

The tufting material required for each row of tufts in the fabric is wound upon a spool contained in a spool-frame, and each spool is fitted to turn upon journals or pivots in a spool-frame, H'. The longitudinal bar of this spool-frame is fitted with as many guide-tubes or eye-guides as there are tufts of material in a row across the fabric. As many spools are used as there are to be rows of tufts in the pattern before the same is repeated, and when the spools are ready for use the tufting-yarns are drawn through the tubes or guides, and are permitted to protrude sufficiently therefrom—say an inch, or thereabout—to be engaged in the warp of the fabric.

In order that the spools may be held and presented in succession to the fabric automatically, two parallel endless chains, $H^2$ $H^2$, are provided. These chains pass around sprocket-wheels $H^3$, Figs. 1, 2, 4, and 22, secured to a shaft, $H^4$, that is supported by the frame of the loom above the level of the breast-beam B and of the lay F, so that the spools are brought down to the warp-threads and are then raised again. The chains are long enough to hold the number of spool-frames required to form the design without repetition, and the chains are supported upon a second pair of sprocket-wheels, H⁵, secured to a second shaft, H⁶, which is at the requisite distance from the first sprocket-shaft, H⁴, to hold the chains distended. If, however, it is found convenient to extend the chains horizontally, it is expedient to provide supporting rollers, rails, or other devices to support the chains between the two sets of sprocket-wheels H³ H⁵. In the loom represented in the drawings each spool-frame in succession is taken from the supporting-chains, is moved by a downward movement to the warp-threads, and is returned to the supporting-chains, which are then moved to bring the next spool-frame into position for being taken in like manner.

In order that each spool-frame may be readily connected with and disconnected from the carrying-chains, each chain is formed of single links $h^3$ and double links $h^4$ in alternate succession, and the ends $h^5$, Figs. 19 and 20, of the spool-frames are fitted to engage in the slots between the members of the double links. Moreover, each end of each spool-frame is provided with a spring-catch, $h^6$, Figs. 19 and 20, whose inclined head, when pressed against the outer edge of the inner member of the double link, yields, passes by the inner side of the link, and engages with its inner edge, so as to hold the spool-frame to the chain. The shanks of these spring-catches $h^6$ are passed through slots in the ends of the spool-frames to their outer sides, where they are in convenient positions to be forced inward for the purpose of disengaging the heads of the catches from the chains, and thereby releasing the spool-frames. Each spool-frame is fitted with a spring-brake, $h^7$, which bears upon the rim of one of the spool-heads, and prevents the spool from turning, unless the tufting material is drawn from it.

In order that the spools may be transferred in succession to the place where the tufts are to be introduced, the lower sprocket-wheel shaft, H⁴, is turned intermittingly, so as to place each spool-frame in succession at the position it occupies when it is to be taken from the chains, as shown in Fig. 4, and the chains then remain at rest while the spool-frame is taken from them, is transferred to the place of weaving, and is then restored to the chains by the spool-transferring mechanism. The chains are then moved to bring the next succeeding spool-frame into its proper position for being taken.

The mechanism for turning the lower sprocket-wheel shaft, H⁴, intermittingly may consist of a ratchet-wheel secured to the sprocket-wheel shaft, of a hook to operate on the ratchet-teeth in succession, so as to pull them round, and of a cam and treadle to move that hook, the cam being secured to the cam-shaft G. A pawl, also, may be provided to prevent retrograde movement when the hook is retrograding. As the construction of such mechanism is well understood by loom-builders, it is not represented in the drawings.

In order that the spool-frames may be taken from the carrying-chains, two transferring-arms, K K, are provided, each being connected with an arm, K', projecting from a rock-shaft, K². The transferring-arms, as represented in Figs. 1, 4, and 8, are pivoted to the rock-shaft arms K', so that the outer ends of the former may be moved horizontally toward and from each other, and their rear ends are inserted into guide-slots at the hubs of the rock-shaft arms K', so that the transferring-arms are prevented from wabbling relatively to the rock-shaft arms in vertical directions. The transferring-arms are caused to vibrate at the time when a spool-frame is to be taken from the carrying-chains and transferred to its position for delivering tufting material to the fabric being woven, and when the spool-frame is to be returned to the carrying-chains, by means of a cam, K³, (see Fig. 4,) secured to the cam-shaft G. This cam is constructed to operate upon the rock-shaft K² of the transferring-arms through the intervention of the friction-wheel K⁴, lever K⁵, and rod K⁶, this rod being connected at its upper end with one of the rock-shaft arms K'. The cam raises the transferring-arms and permits them to descend.

In order that the transferring-arms may grasp and hold the spool-frame, the outer end of each transferring-arm is fitted with a clutch, K⁷, having three horns or projections, $k\ k\ k'$, (see Fig. 21,) the first two, $k\ k$, being separated by a space sufficient to admit the end of the spool-frame easily between them. The third horn, $k'$, is arranged so as to pass beneath the end of the spool-frame. All these horns should be made flaring at their inner sides, so as to enable them to be readily applied to the ends of the spool-frames. In order that these clutches may be made to grasp the spool-frame and to release it, as required in the operation of the loom, the inner ends of the transferring-arms K are connected by rods with the opposite ends of an intermediate lever, K⁹, Fig. 1, which is pivoted to the transfer rock-shaft K². One end of this lever K⁹ is connected with a spring, K¹⁴, which tends to move the clutches inward, so that they grasp the spool-frame between them. The clutches are moved outward to release the spool-frame, and are permitted to move inward to grasp it at the proper times in the operation of the loom, by means of a cam secured to the cam-shaft G. This cam and its connections are the same as those described for the same purpose is said Patent No. 186,374, and are omitted from the drawings for the sake of perspicuity. The cam, as described in said Patent No. 186,374, operates upon the rear end of one of the vibrating arms K through the intervention of a friction-wheel, lever, rod, and wedge, the wedge entering between the end of the vibrating arm and a guide secured to the hub of the rock-shaft arm K'. The cam moves the wedge in one direction, and permits it to be moved in the reverse direction by a spring. The motion is imparted from one of the vibrating arms to the other by means of the rods $k^4$ and intermediate lever, $K^9$. The spool-frames are carried by the transferring-arms directly downward to the shed without rocking them upon said arms, and the tubes or guides of the tufting material are thereby inserted points downward, or directly between the warp-threads. For this purpose the clutches $K^7$ are fixed or otherwise connected with the ends of the transferring-arms K, so that no rocking of the tubes or guides between the warp-threads takes place, and that the tubes or eye-guides are caused to enter points forward between the warp-threads. In order, however, that the tufting-yarns protruding from the tubes may not be accidentally displaced when striking the warp-threads during the direct downward movement, it is expedient to bend their ends (which project beyond the guide-tubes) crosswise of the length of the guide-tubes. This bending is effected in the loom represented in the drawings by means of a bending-bar, U, which extends crosswise of the loom, and is connected at its ends with a pair of vibrating arms, U', which are moved to move the bending-bar. In order that these arms and the bending-bar U, connected with them, may be operated, the arms are secured to a rock-shaft, $U^2$, which is supported in bearings upon the standards of the loom-frame, and is operated by the cam $U^3$, secured to the cam-shaft G. The cam is connected with the arms and rock-shaft through the intervention of the lever $U^4$ and the connecting-rod $U^5$, which connects with a pivot secured to one of the arms U'. The lever $U^4$ is fitted with a truck or friction-wheel, which runs on the cam. The cam raises the arms and the bending-bar U, and permits them to descend at the proper times by their weight. The bending-bar descends in a curve, and it is so arranged relatively to the transferring-arms that it passes crosswise in a backward direction beneath the ends of the tubes or guides of the spool-frame carried by those arms before the tubes are inserted between the warp-threads, thus bending the ends of tufting material backward, and thereby facilitating their entrance between the warp-threads by a direct downward movement. After the tufting material has been introduced automatically between the warp-threads by a direct downward movement, as above described, a shoot of weft-thread or filling is introduced, the shed is closed, and the filling is beaten up by the lay. Then the ends of the tufting material are turned upward around this weft-thread and between the warp-threads, so as to form parts of the tufts at the upper side of the carpet. The turning up of these ends of tufting material is effected by means of a comb or some equivalent for it—such as a brush—operated automatically at the under side of the warp-threads.

The comb M, Figs. 24 and 26, which is used in the loom represented in the drawings, is fitted with lugs which are connected by pivots with a pair of arms, M', projecting from the rocking comb-shaft $M^2$, and this shaft is caused to rock at proper times by means of the cam $M^3$, which is secured to the cam-shaft G, and which operates the comb-shaft $M^2$ through the intervention of the lever $M^5$, the rod $M^6$, and the arm $M^7$, depending from the comb rock-shaft $M^2$. A spring is provided to move the comb antagonistically to the cam whenever the form of the comb-cam permits such motions, said spring being connected with one of the arms M' of the comb-shaft $M^2$. The comb-cam raises the comb, and the comb-spring insures its return. In order that the comb may rise properly, notwithstanding its connection with the arms of the comb rock-shaft by pivots, the lower end of one of the comb-lugs is connected with a spring, $m$, which tends to bear the comb backward against guide-brackets $m'$, which guide the comb as it is raised, one of said brackets being secured at each side of the loom in a position to operate upon the adjacent end of the comb. After the tufting material is secured in the fabric, the spool-frame is slightly raised by the transferring-arms or their substitutes to permit the portions of tufting material which are to form the row of tufts in the fabric to be cut loose from the residue upon the spools, and the spool-frame is held at rest while the cutting is effected. The cutting may be effected in various ways; but if the portion of the present invention which relates to the cutting is employed, that operation is effected by means of the cutting-clamp and reciprocating scalloped cutter represented in the drawings, the scalloped cutter operating at one side of the row of tufting material, and the cutting-clamp operating at the opposite side thereof and supporting said material against the action of the scalloped cutter. The clamp P, Figs. 2, 3, 6, 24, and 25, consists of a grooved bar, $p'$, presenting two blunt edges across the fabric, with a groove between them sufficiently deep to receive the edge of the scalloped cutter N. This scalloped cutter or knife N is composed of a steel blade or blades secured to a stock, N', and is constructed to reciprocate crosswise of the loom in a sheath or case, $N^2$. This case partially covers the blade or blades, but leaves the operating scalloped edges extending beyond the edges of the sheath. The clamp P is connected by arms $P^2$ with a rock-shaft, $P^3$, Fig. 6, and the cutter-sheath also is connected by arms $N^3$ with a second rock-shaft, $N^{11}$, so that both the clamp and the cutter may be moved toward and from the central or mean position or cutting-line at which they meet and cut the tufting material, and when they so meet the scalloped edges of the cutters are received between the lips or edges of the clamp.

In order that the clamp and the cutter may be moved in opposite directions toward and from the cutting-line, one arm of each of their rock-shafts P³ N″ is connected by rods P⁴ and N⁴ with one branch of a T-lever, Q′, whose stem $q$ is fitted with a truck, $q'$, which is operated by the cam Q. The two rock-shafts P³ N″ are connected with the opposite branches of the T-lever, so that when it is rocked by the action of the cam Q the clamp and cutter are moved toward the cutting-line from opposite sides thereof.

In order that the clamp and cutter may be returned to their position when the cutting is effected, a spring, Q², is employed, acting antagonistically to the cutting-cam, said spring being in this case connected with an arm projecting from the hub of one of the rock-shaft arms N³ of the cutter. When the clamp and cutter are brought together, the cutter is drawn lengthwise to effect the cutting, and is afterward returned, so that it may be ready to make the succeeding cut. The cutting movement is effected by means of the cutting-cam N⁶, which operates upon the cutter through the intervention of the cam-lever N⁷, the connecting-rod N⁸, the upright rock-shaft N⁹, the arms N¹⁰, at the opposite end thereof, and the link $n$. The upright arrangement of the rock-shaft N⁹ permits the pivots of the cutter-link $n$ to be upright, so that the link $n$ may move horizontally and accommodate itself to the change of position of the cutter. A spring, N¹², Fig. 2, coiled upon the upright rock-shaft, operates antagonistically to the cutting-cam N⁶, and moves the cutter backward in its sheath when the cutting is effected and the grade of the cutter-cam permits this operation. The cutter-shifting cam Q and the cutting-cam N⁶ are so set relatively to the cam K³, which operates the transferring-arms, that the cutting is effected when the transferring-arms have raised the spool-frame the proper distance above the surface of the body of the fabric being woven, as hereinbefore described.

In the weaving of tufted fabrics by the loom, parts of which are represented in the accompanying drawings, I prefer to introduce the tufting material at every forth shot of the filling. Consequently the cams of the loom are so formed and arranged as to operate in this manner and to interweave three doubled shots of coarse filling with the warp-threads for each doubled shot of fine filling. This plan of weaving may be changed, if deemed expedient, by modifying the cams as required.

The forms of the various devices which I have described and the manner of moving them may be greatly varied without changing, substantially, the mode of operation. Thus, for example, the transferring-arms may be adapted to move in straight lines instead of vibrating through the arc of a circle, and the forms of the clutches and of the spool-frames may also be greatly varied.

I have used cams for imparting the various movements to the members of the loom, with springs acting antagonistically to the cams, because I believe these devices to be those best adapted to convert the rotary motion of the revolving shaft of a loom into the peculiar reciprocating motions which are to be imparted to the operating members; but other devices may be substituted for the cams and springs. I have also used chains to carry the spool-frames; but other equivalent means may be employed to move them in succession to and from the position in which they are taken by the clutches. So, also, the transmitting devices for transmitting the motions from the cams or their substitutes to the various parts of the loom may be changed, as found expedient, to suit the views of different constructers or users.

I have also described that the spool-frames are detached from the chains when they are moved to the position for having the ends of the tufting material inserted in the fabric; but this detachment of the spool-frame from its carrier is not of essence to this part of my invention, which primarily requires only such a construction of transferring arms and clutches or their substitutes for moving the spool-frame to be used that the yarn tubes or guides of the spool-frame may be moved directly or points downward between the warp-threads, instead of being rocked sidewise between the warp-threads, (to meet the tufting material,) and that the spool-frame may subsequently be swung or moved back to the position from which it was diverted after the tufts have been cut loose from the material on the spool.

I claim as my invention—

1. The weft-carrier constructed, substantially as before set forth, with an open head having projections at one side for holding the weft-thread or filling in a loop across the opening of the head.

2. The weft-carrier constructed, substantially as before set forth, with an open head composed of spring-jaws having projections upon them to hold the weft-thread or filling.

3. The combination, substantially as before set forth, of the open-headed spring-jawed weft-carrier and the spring-tension weft-guide.

4. The spring-tension weft-guide composed, substantially as before set forth, of the stock, the spring-nipper, the tension-cam, the arm for operating said cam, and the weft-guides for guiding the filling past said arm.

5. The combination, substantially as before set forth, of the weft-carrier constructed with an open head of spring-jaws, and a reciprocating shuttle which passes the selvage-thread through said open head.

6. The combination, substantially as before set forth, of the weft-carrier with a movable weft-horn, which is arranged at the side of the loom from which the weft-carrier advances, and which engages with the weft-thread and releases it during the advance of the weft-carrier toward the opposite side of the loom.

7. The combination, substantially as before set forth, of the weft-carrier, the movable weft-horn arranged at the side of the loom from which the weft-carrier advances, and the selvage-shuttle arranged at the opposite side of the loom.

8. The combination, substantially as before set forth, of the weft-horn arranged at the side of the loom from which the weft-carrier advances, with the weft-horn cam and its connections, whereby movement in four directions is imparted to said weft-horn.

9. The combination, substantially as before set forth, of the stock of the weft-horn, the friction-bar connected therewith, and the friction-box operating upon said bar.

10. The combination, substantially as before set forth, of the open-headed spring-jawed weft-carrier and selvage-shuttle with the take-up composed of the weft-guides, the cam-finger, and the take-up cam for operating said cam-finger.

11. The combination, substantially as before set forth, of the transferring-arms and the bending-bar for bending the ends of the tufting material crosswise.

12. The combination, substantially as before set forth, of the transferring-arms, the clutches secured in fixed positions to the ends of said arms, and the comb operating from beneath the position of the warp-threads to push the ends of the tufting material upward.

13. The combination, substantially as before set forth, of the transferring-arms, the clutches secured in fixed positions to the ends of said arms, the bending-bar, and the comb operating from beneath the positions of the warp-threads to turn the ends of the tufting material upward.

14. The combination, substantially as before set forth, of the cutting-clamp and the reciprocating scalloped cutter, which are moved from opposite sides of the cutting-line in opposite directions toward the same, the former to support the tufting material and the latter to cut it.

15. The combination, substantially as before set forth, of the cutting-clamp, the reciprocating scalloped cutter, and the cam and spring for moving them to and from the cutting-line.

In witness whereof I have hereto set my hand this 29th day of June, A. D. 1880.

HALCYON SKINNER.

Witnesses:
THEODORE FITCH,
WM. S. CARR.